(12) United States Patent
Hansen et al.

(10) Patent No.: US 12,553,235 B2
(45) Date of Patent: Feb. 17, 2026

(54) METHOD OF REDUCING THE FORMALDEHYDE EMISSION OF A MINERAL FIBER PRODUCT, AND MINERAL FIBER PRODUCT WITH REDUCED FORMALDEHYDE EMISSION

(71) Applicant: ROCKWOOL A/S, Hedehusene (DK)

(72) Inventors: Erling Lennart Hansen, Virum (DK); Lars Naerum, Virum (DK); Povl Nissen, Hellerup (DK)

(73) Assignee: ROCKWOOL A/S, Hedehusene (DK)

( * ) Notice: Subject to any disclaimer, the term of this patent is extended or adjusted under 35 U.S.C. 154(b) by 977 days.

(21) Appl. No.: 17/643,453

(22) Filed: Dec. 9, 2021

(65) Prior Publication Data

US 2022/0098855 A1   Mar. 31, 2022

Related U.S. Application Data

(62) Division of application No. 13/884,758, filed as application No. PCT/EP2011/071732 on Dec. 5, 2011, now abandoned.

(60) Provisional application No. 61/420,906, filed on Dec. 8, 2010.

(30) Foreign Application Priority Data

Dec. 6, 2010   (EP) .................... 10193849

(51) Int. Cl.
| | |
|---|---|
| E04B 1/74 | (2006.01) |
| C03C 25/26 | (2018.01) |
| C03C 25/34 | (2006.01) |
| C08J 5/04 | (2006.01) |
| C08J 5/24 | (2006.01) |
| C09J 161/30 | (2006.01) |
| C09J 161/32 | (2006.01) |
| D04H 1/4209 | (2012.01) |
| D04H 1/58 | (2012.01) |
| D04H 3/12 | (2006.01) |
| E04B 1/76 | (2006.01) |
| F16L 59/00 | (2006.01) |

(52) U.S. Cl.
CPC ............ *E04B 1/74* (2013.01); *C03C 25/26* (2013.01); *C03C 25/34* (2013.01); *C08J 5/04* (2013.01); *C08J 5/241* (2021.05); *C08J 5/249* (2021.05); *C09J 161/30* (2013.01); *C09J 161/32* (2013.01); *D04H 1/4209* (2013.01); *D04H 1/58* (2013.01); *D04H 3/12* (2013.01); *E04B 1/7658* (2013.01); *F16L 59/00* (2013.01); *C08J 2361/14* (2013.01); *Y10T 442/60* (2015.04)

(58) Field of Classification Search
CPC ............ E04B 1/74; C03C 25/26; C03C 25/34
See application file for complete search history.

(56) References Cited

U.S. PATENT DOCUMENTS

| | | | |
|---|---|---|---|
| 4,014,726 | A | 3/1977 | Fargo |
| 4,339,361 | A | 7/1982 | MacPherson et al. |
| 4,663,419 | A | 5/1987 | Fugier et al. |
| 4,710,406 | A | 12/1987 | Fugier et al. |
| 4,761,184 | A | 8/1988 | Markessini |
| 5,371,140 | A | 12/1994 | Parks |
| 5,795,934 | A | 8/1998 | Parks |
| 5,837,621 | A | 11/1998 | Kajander |
| 5,919,528 | A | 7/1999 | Huijs et al. |
| 6,342,271 | B1 | 1/2002 | Lericque et al. |
| 8,034,415 | B2 | 10/2011 | Huenig et al. |
| 8,366,863 | B2 | 2/2013 | Huenig et al. |
| 2005/0170734 | A1 | 8/2005 | Yang |
| 2009/0304919 | A1 | 12/2009 | Wagner et al. |
| 2010/0075146 | A1 | 3/2010 | Douce |
| 2010/0146887 | A1 | 6/2010 | Wilker |
| 2010/0175826 | A1 | 7/2010 | Huenig et al. |
| 2011/0101260 | A1 | 5/2011 | Pons Y Moll et al. |
| 2011/0190425 | A1 | 8/2011 | Swift |
| 2012/0037836 | A1 | 2/2012 | Hansen |
| 2013/0183524 | A1 | 7/2013 | Roncuzzi et al. |

FOREIGN PATENT DOCUMENTS

| | | |
|---|---|---|
| DE | 102005063381 A1 | 5/2007 |
| EP | 148050 A2 | 7/1985 |
| EP | 2230222 A1 | 9/2010 |
| RU | 1838356 A3 | 8/1993 |
| WO | 9626164 A1 | 8/1996 |
| WO | 9903906 A1 | 1/1999 |
| WO | 2006136614 A1 | 12/2006 |
| WO | 2008127936 A2 | 10/2008 |
| WO | 2009136106 A2 | 11/2009 |
| WO | 2012025699 A1 | 3/2012 |

*Primary Examiner* — Catherine S Branch
*Assistant Examiner* — Olga Lucia Donahue
(74) *Attorney, Agent, or Firm* — Abel Schillinger, LLP

(57) ABSTRACT

A method of reducing the formaldehyde emission of a mineral fiber product bonded with a urea-modified phenol-formaldehyde resol resin-type binder comprises adding dextrose to the binder composition during and/or after preparation of the binder composition but before curing of the binder composition applied to the mineral fibers.

17 Claims, No Drawings

METHOD OF REDUCING THE FORMALDEHYDE EMISSION OF A MINERAL FIBER PRODUCT, AND MINERAL FIBER PRODUCT WITH REDUCED FORMALDEHYDE EMISSION

CROSS-REFERENCE TO RELATED APPLICATIONS

The present application is a divisional of patent application Ser. No. 13/884,758, filed on Jul. 1, 2013, the entire disclosure of which is expressly incorporated by reference herein, which is a 371 of PCT/EP2011/071732, filed on Dec. 5, 2011, which claims the benefit of provisional Patent Application No. 61/420,906, filed on Dec. 8, 2010 and claims priority under 35 U.S.C. § 119 of European Patent Application 10193849.6, filed on Dec. 6, 2010.

FIELD OF THE INVENTION

The present invention relates to a method of reducing the formaldehyde emission of a mineral fiber product, and to bonded mineral fiber products having low formaldehyde emission.

BACKGROUND OF THE INVENTION

Mineral fiber products generally comprise man-made vitreous fibers (MMVF) such as, e.g., glass fibers, ceramic fibers, basalt fibers, slag wool, mineral wool and stone wool, which are bonded together by a cured thermoset polymeric binder material. For use as thermal and/or acoustical insulation products, bonded mineral fiber mats are generally produced by converting a melt made of suitable raw materials to fibers in conventional manner, for instance by a spinning cup process or by a cascade rotor process. The fibers are blown into a forming chamber and, while airborne and while still hot, are sprayed with a binder solution and randomly deposited as a mat or web onto a travelling conveyor. The fiber mat is then transferred to a curing oven where heated air is blown through the mat to cure the binder and rigidly bond the mineral fibers together.

Phenolic binders, in particular phenol-formaldehyde resole resins are frequently used in the manufacture of mineral fiber insulation materials, such as insulative batts for walls, roof boards, ceiling tiles, insulative coverings for pipes, and the like.

Typically, when a phenol-formaldehyde resole resin is used as a binder, a significant amount of formaldehyde is released into the environment during cure. Formaldehyde also can be released subsequently from the cured resin. Such formaldehyde emission is undesirable, particularly in enclosed spaces, because it is hazardous to human health and to the environment. Formaldehyde has been classified as carcinogenic to humans by The International Agency for Research on Cancer (IARC) of the World Health Organization (WHO); see the IARC Monograph on Formaldehyde, Volume 88 (2006). It is therefore desirable to reduce the release of formaldehyde into the environment.

Various techniques have been used to reduce formaldehyde emission from formaldehyde-based resins. In particular, various formaldehyde scavengers have been used for that purpose. For instance, urea acts as a formaldehyde scavenger both at, and subsequent to, the manufacture of bonded mineral fiber products. Urea is typically added directly to the phenol-formaldehyde resin to produce a urea-modified phenol-formaldehyde resole resin. To obtain a typical urea-modified resole binder resin, a mixture of phenol and formaldehyde is reacted with a suitable basic catalyst in one or more steps. The reaction conditions, temperature, amount of catalyst, etc., are adjusted to favour phenol methylolation reactions over condensation reactions. Urea is then added before or after inactivating the resin just prior to use of the resin. Such a resin is typically referred to as a PUF resin, or PUF binder.

Another commonly used formaldehyde scavenger is ammonia which binds formaldehyde with formation of amine compounds such as hexamethylene tetramine.

For instance, WO 96/26164 describes a phenol-formaldehyde resin composition for use as a binder in mineral wool products wherein the emission of phenol is reduced by using a stoichiometric excess of formaldehyde over phenol, wherein the emission of the excess formaldehyde is reduced by adding ammonia as a formaldehyde scavenger and wherein the emission of ammonia is reduced by reacting the ammonia with a sugar compound.

Other thermosetting phenol-formaldehyde resole resin-type mineral wool binder systems that contain a sugar component are known in the art. For instance, WO 2006/136614 discloses a binder system similar to that of WO 96/26164 but substituting hydroxylamine or an amino alcohol for ammonia.

U.S. Pat. No. 4,339,361 discloses phenol-formaldehyde resole resins which are suitable for use in binder systems for bonding mineral fiber products and which are extended with an amide or amine such as urea and a sugar as inexpensive extenders. The sugar component may be selected from mono- and oligosaccharides and water-soluble polysaccharides.

WO 2009/136106 discloses mineral wool binders comprising a liquid phenolic resin having a free formaldehyde content of less than or equal to 0.1% and an extender. The extender may be chosen from carbohydrates, including monosaccharides, oligosaccharides and polysaccharides.

U.S. Pat. No. 5,795,934 discloses a urea-modified phenol-formaldehyde resole resin composition which comprises an alkanolamine alone or preferably in combination with a monosaccharide or disaccharide in an amount sufficient to improve the storage stability of the urea-modified phenolic resole resin.

WO 2008/127936 discloses composite Maillard-resole binder compositions comprising a phenol-formaldehyde resole resin or urea-modified phenol-formaldehyde resole resin and so-called Maillard reactants which comprise a mixture of a monosaccharide and an ammonium salt of a polycarboxylic acid.

SUMMARY OF THE INVENTION

The present invention is based on the discovery that dextrose acts as a formaldehyde scavenger in the manufacture of mineral fiber products bonded with a urea-modified phenol-formaldehyde resole resin-type binder.

Accordingly, in one aspect, the present invention relates to a method of reducing the formaldehyde emission of a mineral fiber product bonded with a urea-modified phenol-formaldehyde resol resin-type binder, said method comprising the step of adding dextrose to the binder composition during and/or after preparation of the binder composition but before curing of the binder composition applied to the mineral fibers. Preferably, the dextrose is added to the binder composition after the preparation of the binder composition but before curing of the binder composition applied to the mineral fibers.

In another aspect, the present invention relates to a mineral fiber product having reduced formaldehyde emission and bonded with a cured urea-modified phenol-formaldehyde resol resin-type binder composition, the non-cured binder composition comprising dextrose in an amount of 15 wt % or more, and up to 70 wt %, based on total dry solids of phenol-formaldehyde resol resin and dextrose.

In a further aspect, the present invention relates to the use of dextrose as a formaldehyde scavenger in a urea-modified phenol-formaldehyde resol resin-type binder composition for mineral fiber products. The dextrose used may be pure dextrose or in the form of a dextrose preparation having a DE equivalent of about 70 to 100, preferably about 90 to 100. The phenol may be reacted with molar excess formaldehyde in aqueous solution in a molar ratio of from 1:2.5 to 1:6; preferably from 1:3 to 1:5, in the presence of a base catalyst. The urea used may be in an amount of from 20 to 60 wt %, preferably 30 to 50 wt %, based on total dry solids of the phenol-formaldehyde resol resin and urea. The dextrose used may be in an amount of 15 to 70 wt %, preferably 20 to 50 wt %, based on total dry solids of urea-modified phenol-formaldehyde resol resin and dextrose.

The use is preferably carried out with a step of adding dextrose to the binder composition during and/or after preparation of the binder composition but before curing of the binder composition applied to the mineral fibers.

In still another aspect, the present invention relates to an apparatus for making a mineral fiber product having reduced formaldehyde emission and bonded with a cured urea-modified phenol-formaldehyde resol resin-type binder composition with dextrose added to the binder composition, said apparatus comprising means for fiberising a mineral melt to mineral fibers,
separate tanks for the binder composition and dextrose;
means for mixing the binder composition and the dextrose,
means for applying the mixture of binder composition and dextrose to the mineral fibers,
a collecting chamber for the mineral fibers with the applied mixed binder composition and dextrose,
a curing oven for curing the mixed binder composition and dextrose applied to the mineral fibers to form a cured web, and
means for confectioning the cured web to a mineral fiber product.

The confectioning of the mineral wool cured web is in the conventional meaning of cutting and packaging the web into products.

The dextrose used may be pure dextrose or in the form of a dextrose preparation having a DE equivalent of about 70 to 100, preferably about 90 to 100. The phenol may be reacted with molar excess formaldehyde in aqueous solution in a molar ratio of from 1:2.5 to 1:6; preferably from 1:3 to 1:5, in the presence of a base catalyst. The urea used may be in an amount of from 20 to 60 wt %, preferably 30 to 50 wt %, based on total dry solids of the phenol-formaldehyde resol resin and urea. The dextrose used may be in an amount of 15 to 70 wt %, preferably 20 to 50 wt %, based on total dry solids of urea-modified phenol-formaldehyde resol resin and dextrose.

The inventors have surprisingly found that by adding dextrose to a urea-modified phenol-formaldehyde resol resin-type binder composition, the formaldehyde emission of the bonded mineral fiber product after curing can be reduced down to values which cannot be explained by a mere dilution effect; i.e. by dextrose merely acting as an diluent or extender. For instance, with a mineral wool product bonded with 4,92% of a binder comprising a 43/57 (wt %) mixture of urea-modified phenol-formaldehyde resol resin and dextrose, a formaldehyde emission of 13 μg/m$^3$ was determined instead of an expected value (assuming a pure dilution effect) of 40 μg/m$^3$. Likewise, with a mineral wool product bonded with 3,59% of a binder comprising a 54/46 (wt %) mixture of urea-modified phenol-formaldehyde resol resin and dextrose, a formaldehyde emission of 7 μg/m$^3$ was measured instead of an expected value of 43 μg/m$^3$.

The notion of "reduced formaldehyde" is herein construed as a reduction in the formaldehyde emission, compared with an otherwise identical product in terms of binder content, urea content, ammonia content and product density.

DETAILED DESCRIPTION AND PREFERRED EMBODIMENTS

Urea-Modified Phenol-Formaldehyde Resol Resin

In accordance with the present invention, the nature of the urea-modified phenol-formaldehyde resol resin is not critical, and any urea-modified phenol-formaldehyde resol resin known in the art may be used.

However, in accordance with the invention, preferably no substantive urea-formaldehyde (UF) resin formation is taking place, i.e. a dedicated UF formation giving the resin the character of a UF resin is preferably not aimed at.

Specific examples of suitable urea-modified phenol-formaldehyde resol resins are, for instance, those disclosed in EP-A-148050, EP-A-810981, CA-A-1001788 and U.S. Pat. No. 5,371,140; the emulsifiable phenolic resins disclosed in EP-A-1084167; the overcondensed phenolic resins disclosed in WO 99/03906 and WO 2009/136106, the disclosures of which are hereby incorporated by reference.

The proportion of phenol to aldehyde is selected to yield a resol-type resin (stoichiometric excess of aldehyde), when phenol and formaldehyde are used, the mole ratio of phenol to formaldehyde preferably being from about 1:2.5 to 1:6, and more preferably from about 1:3 to 1:5.

The catalyst used in the process of preparing the resol resin can include at least one basic alkali metal or alkaline earth metal compound or amine catalyst, such as triethyl amine (TEA). Examples of alkali metal bases which can be used include the hydroxides of sodium, potassium and lithium. Examples of alkaline earth metal bases which can be used include the oxides and hydroxides of calcium, barium and strontium, such as calcium oxide and calcium hydroxide.

The exothermic condensation reaction of the phenol and the aldehyde is initiated after mixing the phenol and the aldehyde by addition of the catalyst. In a preferred embodiment, an aqueous mixture of phenol and formaldehyde is maintained at a first temperature of, for instance, 40 to 50° C., as the basic catalyst is added. The temperature is then permitted to rise to a second reaction temperature of, for instance, 60 to 90° C. Preferably, the reaction is carried out for a sufficient reaction time and at a suitable temperature to provide a resol resin having an acid tolerance of 8, preferably within the range of 0.5 to 7, more preferably 3 to 5. The degree of conversion of phenol is preferably 95%, more preferably 97%.

Acid tolerance is a measure of the reaction degree and is determined as follows:

As acid is used a diluted solution of sulphuric acid (2.5 ml of concentrated sulphuric acid is added to 1 litre of ion-exchanged water). 5.0 ml of binder is transferred into an Erlenmeyer flask. Diluted acid is then added from a burette while keeping the binder in motion. The titration is continued until a slight cloud appears in the binder, which does not disappear when the binder is shaken. The acid tolerance is calculated by dividing the amount of acid in ml used for the titration with the amount of ml of the sample.

The reaction mixture may be inactivated by addition of a latent acid such as ammonium sulphate or an acid such as sulfuric acid.

For modification of the phenol-formaldehyde resol resin with urea, urea is preferably added and/or reacted in an amount of from about 20 to 60 wt %, preferably 20 to 50 wt %, based on total dry solids of phenol-formaldehyde resol resin and urea. The urea may be added to the resol resin during its preparation or in a post-reaction step.

Dextrose

In accordance with the present invention, dextrose is added to the binder composition during and/or after preparation of the binder composition but before curing of the binder composition applied to the mineral fibers.

For use as a formaldehyde scavenger, dextrose may be used as pure dextrose (glucose) or in the form of a dextrose preparation having a DE equivalent of about 70 to 100, preferably about 90 to 100.

Dextrose is normally produced by subjecting an aqueous slurry of starch to hydrolysis by means of heat, acid or enzymes. Depending on the reaction conditions employed in the hydrolysis of starch, a variety of mixtures of glucose and intermediates is obtained which may be characterized by their DE number. DE is an abbreviation for Dextrose Equivalent and is defined as the content of reducing sugars, expressed as the number of grams of anhydrous D-glucose per 100 g of the dry matter in the sample, when determined by the method specified in International Standard ISO 5377-1981 (E). This method measures reducing end groups and attaches a DE of 100 to pure glucose (=dextrose) and a DE of 0 to pure starch.

In accordance with the present invention, pure dextrose or high DE glucose syrup are preferably used as formaldehyde scavengers.

Binder Composition

The non-cured binder composition according to the present invention generally contains dextrose in an amount of from 15 to 70 wt %, preferably 20 to 50 wt %, based on total dry solids of phenol-formaldehyde resol resin and dextrose. Preferred lower concentrations of dextrose are 15 wt %, 20 wt %, 25 wt %, 30 wt %, 35 wt %, 40 wt % and 45 wt %. Preferred higher concentrations of dextrose are 50 wt %, 55 wt %, 60 wt %, 65 wt % and 70 wt %. Depending on the properties desired and on the type and amount of formaldehyde generators present, the skilled person will employ dextrose in appropriate concentration ranges between these values.

In addition to the urea-modified phenol-formaldehyde resole resin and dextrose, the aqueous binder compositions according to the present invention may comprise one or more conventional binder additives. These include, for instance, curing accelerators such as the free acid and salt forms of strong acids such as boric acid, sulphuric acid, nitric acid and p-toluenesulphonic acid which may be used either alone or in combination with guanidine carbonate. Other suitable binder additives are, for example, silane coupling agents such as γ-aminopropyltriethoxysilane; thermal stabilizers; UV stabilizers; emulsifiers; surface active agents, particularly nonionic surfactants; biocides; plasticizers; anti-migration aids; coalescents; fillers and extenders such as starch, clay, silicates and magnesium hydroxide; pigments such as titanium dioxide; hydrophobizing agents such as fluorinated compounds, mineral oils and silicone oils; flame retardants; corrosion inhibitors such as thiourea; antifoaming agents; antioxidants; and others.

These binder additives and adjuvants may be used in conventional amounts generally not exceeding 20 wt. % of the binder solids. The amount of curing accelerator in the binder composition is generally between 0.05 and 5 wt. %, based on solids.

The final aqueous binder composition generally has a solids content of from 1 to 20 wt. % and a pH of 6 or higher.

The binder composition according to the present invention preferably does not contain any one of the following components:

hydroxylamine; amino alcohols; alkanol amines; polycarboxylic acids and ammonium salts of polycarboxylic acids; sugar alcohols.

Mineral Fiber Product

The mineral fibers employed may be any of man-made vitreous fibers (MMVF), glass fibers, ceramic fibers, basalt fibers, slag fibers, rock fibers, stone fibers and others. These fibers may be present as a wool product, e.g. like a rock wool product.

Suitable fiber formation methods and subsequent production steps for manufacturing the mineral fiber product are those conventional in the art. Generally, the binder is sprayed immediately after fibrillation of the mineral melt on to the airborne mineral fibers. The aqueous binder composition is normally applied in an amount of 0.1 to 10%, preferably 0.2 to 8% by weight, of the bonded mineral fiber product on a dry basis.

The spray-coated mineral fiber web is generally cured in a curing oven by means of a hot air stream. The hot air stream may be introduced into the mineral fiber web from below, or above or from alternating directions in distinctive zones in the length direction of the curing oven.

Typically, the curing oven is operated at a temperature of from about 150 to 350° C. Preferably, the curing temperature ranges from about 200 to about 300° C. Generally, the curing oven residence time is from 30 seconds to 20 minutes, depending on, for instance, the product density.

If desired, the mineral wool web may be subjected to a shaping process before curing. The bonded mineral fiber products emerging from the curing oven may be cut to a desired format e.g., in the form of a batt. Thus, the mineral fiber products produced may, for instance, have the form of mats, batts, slabs, sheets, plates, strips, rolls, pipe sections, granulates, and other shaped articles.

A specific type of bonded mineral fiber product is a horticultural growth substrate product. Such horticultural growth substrate products may be in any of the known forms for growth substrate products, such as those usually known as plugs, blocks, slabs and mats. In particular the invention is beneficial in the case where the product is in a form generally known for use as a substrate for the propagation stage.

The horticultural growth substrate product has a greater uniformity of environment across the set of seeds being grown, leading to greater uniformity of the end-product plants; this leads to generally improved plant quality.

The growth substrate product may further comprise a wetting agent. This can be a conventional non-ionic surfactant but preferably the wetting agent is an ionic surfactant, more preferably an anionic surfactant. Particularly preferred wetting agents are anionic surfactants such as linear alkyl benzene sulphonates wherein the alkyl chain has from 5 to 20 carbon atoms. Preferably the amount (by weight) of ionic surfactant based on the weight of binder (dry matter) is in the range 0.01 to 5%, preferably 0.1 to 4%.

This type of surfactant provides particularly beneficial water distribution properties for growth substrates of relatively large height and also provides excellent re-saturation properties and does not lead to foaming problems in the irrigation water.

In accordance with the present invention, it is also possible to produce composite materials by combining the bonded mineral fiber product with suitable composite layers or laminate layers such as, e.g., metal, glass surfacing mats and other woven or non-woven materials.

The mineral fiber products according to the present invention generally have a density within the range of from 5 to 250 kg/m$^3$, preferably 20 to 200 kg/m$^3$.

A particular group of mineral fiber products according to the present invention are ceiling tiles having a density of from 50 to 220 kg/m$^3$ and manufactured using a non-cured binder composition comprising dextrose in an amount of 20 to 70 wt %, preferably 40 to 70 wt %, based on total dry solids of phenol-formaldehyde resol resin and dextrose.

Another group of mineral fiber products according to the present invention are roof boards having a density of from 100 to 250 kg/m$^3$ and manufactured using a non-cured binder composition comprising dextrose in an amount of 20 to 50 wt %, preferably 20 to 40 wt %, based on total dry solids of phenol-formaldehyde resol resin and dextrose.

There are essentially two types of roof boards: mono density and dual density roof boards such as disclosed, e.g., in EP-A-889981 and EP-A-1456444, the disclosure of which is incorporated herein by reference.

In preferred dual density roof boards, the mineral fiber batts include an upper layer having a density of around 100 to 250 kg/m$^3$ and a lower layer with a density which is usually not more than 80% but usually more than 30% of the density of the upper layer, often around 40 to 70% of the density of the upper layer. Usually, the upper and lower layers in the final product have a total thickness of 30 to 300 mm. The lower layer is usually 25 to 275 mm thick and is usually at least 75 mm thick. Generally, it is at least 50%, and often 75 to 95%, of the combined thickness of the upper and lower layers.

The mineral fiber products according to the present invention are light-coloured and often brownish to a varying degree, depending on the amount of dextrose.

The mineral fiber products according to the present invention satisfy the formaldehyde emission requirements of international building industry standards.

For instance, tests with mineral fiber products according to the invention showed that the formaldehyde emission requirements of Finnish Standard RTS-M1 (limit 50 μg/m$^2$ h) for a roof board can be met by using >20 wt % of dextrose. The Finnish Standard RTS-M1 standard determines the emission of the sample after 4 weeks in a testing chamber according to ISO-16000-9, first edition, corrected version 2006 Jun. 15.

Similarly, the formaldehyde emission requirements of U.S. Standard CDHS (version 15 Jul. 2004; limit 16.5 μg/m$^3$) for a roof board can be met by using >30 wt % of dextrose, and the formaldehyde emission requirements of Japanese Standard JIS A 1901-2003 (E) (limit 12 μg/m$^3$, the F*** limit) can be met by using about 47 wt % of dextrose.

Another standard that is met by the product according to the present invention is the Greenguard Children and Schools standard limit, which corresponds to a specific emission rate of approximately 35 μg/m$^2$ h. Preferably, this standard is met for a building insulation product board or roll having a density of from 5 to 70 kg/m$^3$ and manufactured using a non-cured binder composition comprising dextrose in an amount of 10 to 50 wt %, preferably 20 to 40 wt %, based on total dry solids of phenol-formaldehyde resol resin and dextrose.

The following examples are intended to illustrate the invention without limiting its scope. Unless indicated otherwise, the solids content (dry matter) is herein determined at 200° C., 1 hour and expressed as wt. %.

Example 1

A phenol-formaldehyde resin is prepared by reacting formaldehyde and phenol in a molar ratio of 3.7 to 1 in the presence of a catalyst (6 wt % KOH, relative to the amount of phenol) at a reaction temperature of 84° C. The reaction is continued until the acid tolerance of the resin is 4 and most of the phenol is converted. Urea is then added in an amount corresponding to 52 parts by weight of phenol-formaldehyde resin and 48 parts by weight of urea.

Using the urea-modified phenol-formaldehyde resin obtained, a binder is made by addition of ammonium sulphate in equimolar amounts to the catalyst so as to inactivate the catalyst. The final PUF resin has a free formaldehyde content of <0.5%, relative to the solids.

The thus obtained PUF binder is mixed with a dextrose preparation, Sirodex® 431 from Syral (DE value 95), in the amounts indicated in Table 1 below.

Further, the binder is diluted with water to a solids content equal to 22%, and a commercial prehydrolysed aminosilane is added in an amount corresponding to 0.5% of the solids.

The binder composition obtained is used for production of monolayer roof boards ("A-Tagplade"). Further details are given in the following table.

TABLE 1

|   | PUF Binder % | Dextrose % | Binder content of product * (%) | Product density (kg/m$^3$) |
|---|---|---|---|---|
| A | 100 | 0 | 3.62 | 141 |
| B | 80 | 20 | 3.94 | 139 |
| C | 43 | 57 | 4.92 | 135 |

The PUF binder content (%) and the dextrose content (%) are weight percentages based on total dry solids of phenol-formaldehyde resol resin and dextrose.
* The binder content of product (%) is defined as loss-on ignition (LOI) (%) − impregnation oil (%)

Example 2

A commercial resin PF-0415M from Hexion is used for the test. The resin is a phenol-formaldehyde resin modified with urea and ammonia. Free formaldehyde is <0.3% based on the liquid resin. The amount of urea is 28% in relation to the solids content.

The resin is mixed with a dextrose preparation, Sirodex® 431 (DE value 95) from Syral, in the amounts indicated in Table 2 below. For comparison, a glucose syrup, i.e. C Sweet® 01403 (DE value 30) from Cargill, is used in the amount indicated in Table 2 (Sample H).

The composition is diluted to 15% with water to provide a binder composition and further added with 0.5% of a commercial silane of the type pre-hydrolysed amino silane.

The binder composition obtained is used for production of monolayer roof boards (DP-GF). Further details are given in the following table.

TABLE 2

|   | PUF Binder % | Dextrose % | Binder content of product* (%) | Product density (kg/m³) |
|---|---|---|---|---|
| D | 100 | 0 | 3.43 | 155 |
|   |   |   | 3.20 | 150 |
| E | 72 | 28 | 3.63 | 146 |
| F | 54 | 46 | 3.59 | 151 |
| G | 50 | 50 | 3.66 | 155 |
| H | 80 | 20 | 3.12 | 141 |

The PUF binder content (%) and the dextrose content (%) are weight percentages based on total dry solids of phenol-formaldehyde resol resin and dextrose.
* Binder content of product (%) = LOI (%) − impregnation oil (%)

Example 3

The formaldehyde emission is measured for the products A-H of Examples 1 and 2 and stated in Table 3 below as formaldehyde emission in μg/m³. The emissions were measured in the climate chamber at the Danish Technological Institute (TI) according to standard EN 717-1.

The actually determined values are compared with the expected values (assuming a pure dilution effect of dextrose). The value of 80 for 100 parts of PUF is used as a reference and the expected values are calculated with reference to the value. For instance, the 50/50 PUF/dextrose expected value is (50 PUF/100 PUF)×80=40.

TABLE 3

|   |   | Expected | Measured |
|---|---|---|---|
| A | 100/0 PUF/Dextrose | 80 | 83 |
| B | 80/20 PUF/Dextrose | 64 | 36 |
| C | 43/57 PUF/Dextrose | 40 | 13 |
| D | 100/0 PUF/Dextrose | 80 | 83 (77) |
| E | 72/28 PUF/Dextrose | 58 | 36 |
| F | 54/46 PUF/Dextrose | 43 | 7 |
| G | 50/50 PUF/Dextrose | 40 | 16 |
| H | 80/20 PUF/DE 30 syrup | 64 | 65 |

As can be seen from Table 3, the use of dextrose results in a significant reduction of the formaldehyde emission of the bonded mineral fiber products which cannot be explained by a pure dilution effect.

Sample H is a comparative sample where the dextrose is substituted with a glucose syrup of low dextrose content having a DE-value of 30. Sample H using this sugar syrup does not show a significant reduction in formaldehyde emission compared to the high dextrose content syrups of Examples A-G. Instead, the measured value for the formaldehyde emission of Sample H is as expected when assuming a pure dilution effect.

What is claimed is:

1. A method of reducing the formaldehyde emission of a mineral fiber product bonded with a urea-modified phenol-formaldehyde resol resin binder composition, wherein the method comprises adding dextrose to the binder composition during and/or after preparation of the binder composition but before curing of the binder composition applied to the mineral fibers, and wherein urea is used in an amount of from 20 to 60 wt %, based on total dry solids of the phenol-formaldehyde resol resin and urea, and dextrose is used in an amount of from 30 to 70 wt %, based on total dry solids of urea-modified phenol-formaldehyde resol resin and dextrose, and wherein the binder composition has a solids content of from 1 to 20 wt %.

2. The method of claim 1, wherein dextrose is used as pure dextrose or in the form of a dextrose preparation having a DE equivalent of about 70 to 100.

3. The method of claim 2, wherein the dextrose preparation has a DE equivalent of 90 to 100.

4. The method of claim 1, wherein phenol is reacted with formaldehyde in aqueous solution in a molar ratio of from 1:2.5 to 1:6-in the presence of a base catalyst.

5. The method of claim 4, wherein phenol is reacted with formaldehyde in aqueous solution in a molar ratio of from 1:3 to 1:5.

6. The method of claim 1, wherein urea is used in an amount of from 30 to 50 wt %.

7. The method of claim 6, wherein dextrose is used in an amount of from 40 to 50 wt %, based on total dry solids of urea-modified phenol-formaldehyde resol resin and dextrose.

8. The method of claim 1, wherein dextrose is used in an amount of from 35 to 70 wt %, based on total dry solids of urea-modified phenol-formaldehyde resol resin and dextrose.

9. The method of claim 8, wherein dextrose is used in an amount of from 35 to 50 wt %, based on total dry solids of urea-modified phenol-formaldehyde resol resin and dextrose.

10. The method of claim 1, wherein dextrose is used in an amount of from 40 to 70 wt %, based on total dry solids of urea-modified phenol-formaldehyde resol resin and dextrose.

11. The method of claim 1, wherein the method affords a mineral fiber product which satisfies formaldehyde emission requirements of Finnish Standard RTS-M1.

12. The method of claim 1, wherein the method affords a mineral fiber product which satisfies formaldehyde emission requirements of US Standard CDHS.

13. The method of claim 1, wherein the method affords a mineral fiber product which satisfies formaldehyde emission requirements of Japanese Standard JIS A 19012003 (E).

14. The method of claim 1, wherein the method affords a ceiling tile having a density of from 50 to 220 kg/m³.

15. The method of claim 1, wherein the method affords a roof board having a density of from 100 to 250 kg/m³ or a building insulation product board or roll having a density of from 5 to 70 kg/m³.

16. The method of claim 1, wherein the mineral fibers are rock fibers.

17. The method of claim 1, wherein the binder composition does not contain any of the following: hydroxylamine; amino alcohols; alkanol amines; polycarboxylic acids and ammonium salts of polycarboxylic acids; sugar alcohols.

* * * * *